May 9, 1950 C. C. McCAIN 2,507,315
CYCLE CONTROLLING APPARATUS
Filed Jan. 24, 1945 2 Sheets-Sheet 1
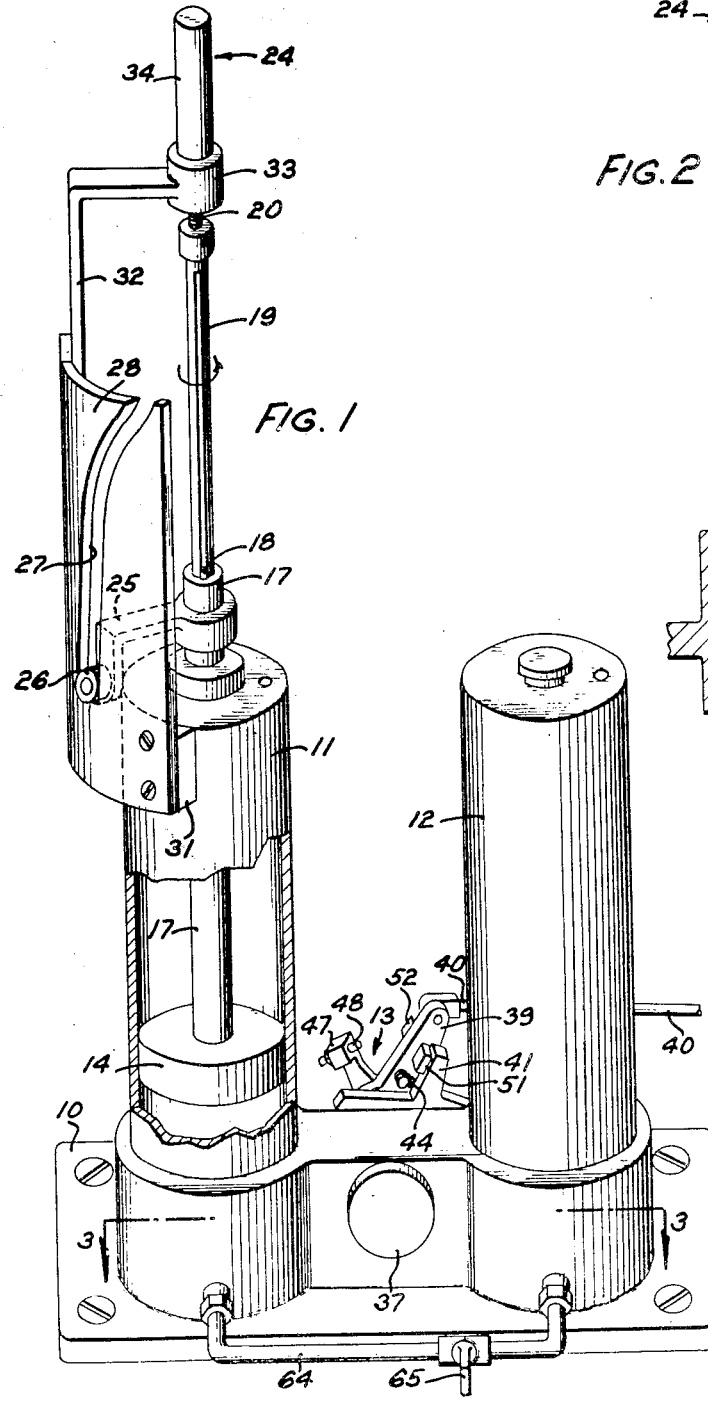
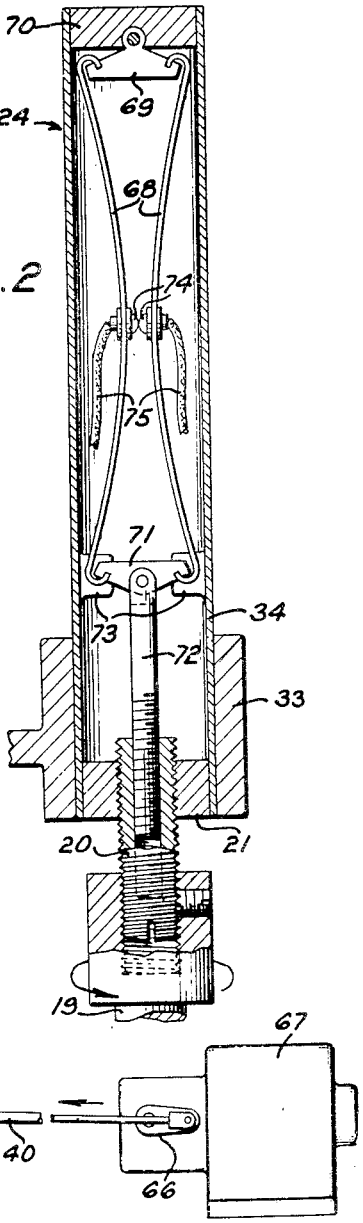
INVENTOR
C. C. McCAIN
BY Harry R. Duft
ATTORNEY

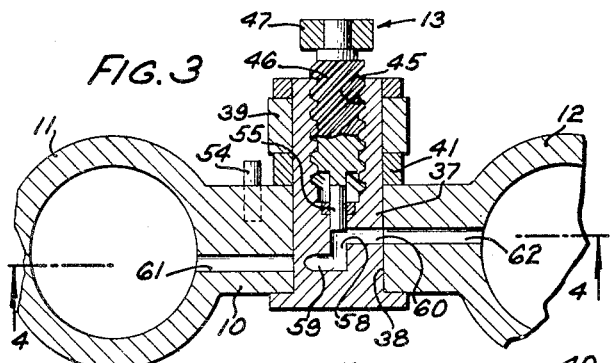
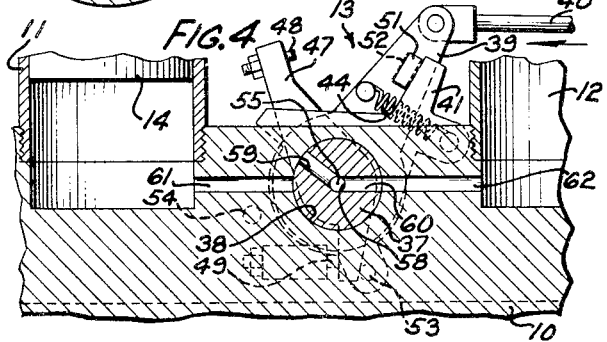
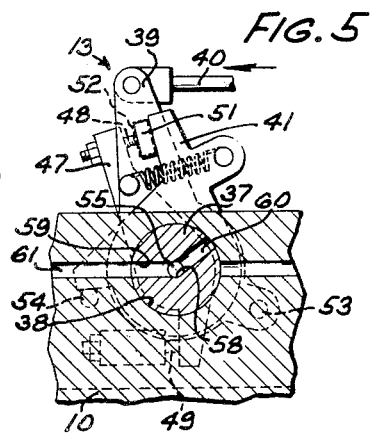
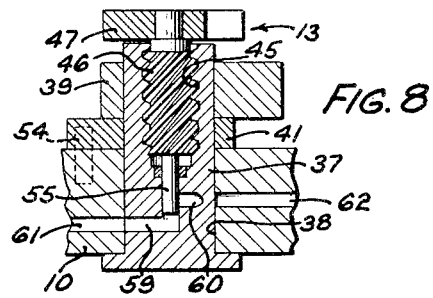
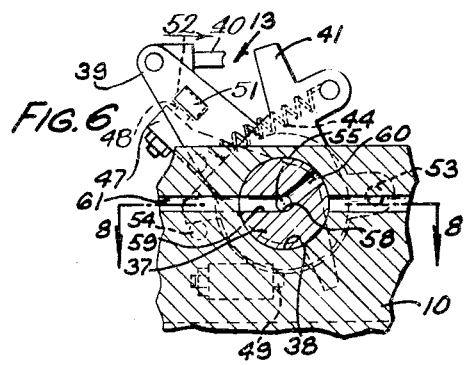
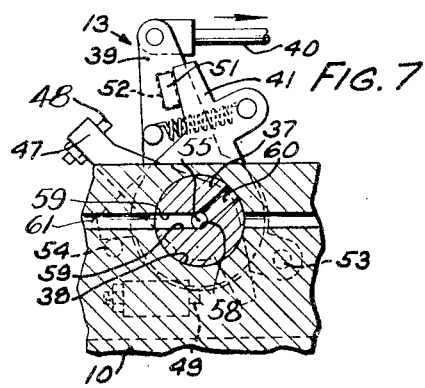

Patented May 9, 1950

2,507,315

UNITED STATES PATENT OFFICE 2,507,315

CYCLE CONTROLLING APPARATUS

Cecil C. McCain, Glen Ellyn, Ill., assignor to Western Electric Company, Incorporated, New York, N. Y., a corporation of New York Application January 24, 1945, Serial No. 574,419

9 Claims. (Cl. 60—52)

This invention relates to cycle controlling apparatus and more particularly to program temperature control mechanisms.

The invention is particularly useful in controlling the temperature in ovens used for growing ammonium dihydrogen phosphate crystals which, in the specific instance, take fifty-five days of continuous oven operation to grow, during which period it is necessary that the oven temperature be dropped in accordance with a definite program from an initial temperature of 120° F. to a room temperature of approximately 72° F.

An object of this invention is to provide a cycle controlling apparatus which is simple, efficient and practicable for effecting a definite cycle control program.

In accordance with the above object, the present invention, in one embodiment thereof, contemplates a mechanism for varying temperature in accordance with a definite program over a considerable period of time, wherein a constant speed actuator drives a hydraulic pump of such small capacity that a hydraulically operated plunger of suitable dimensions actuated thereby will make one stroke in the desired time. The plunger is operatively connected to an adjustable thermostat effective to control the temperature in a space to be heated, the movement of the plunger causing an adjustment of the thermostat in accordance with the program desired. Specifically, the mechanism as applied to controlling the temperature in an oven used in the growing of crystals in the manner above described comprises operatively connecting the hydraulic pump to a constant speed actuator to vary the temperature over a fifty-five day period. An outlet port of the pump communicates with a cylinder and the pump impulses, acting upon a piston and attached rod reciprocable in the cylinder, cause the rod to complete one stroke in the desired period of temperature control. A cam follower carried by the rod and engaging a stationary cam of the required contour causes a 30° rotation of the rod during its complete stroke over a period of fifty-five days and this latter motion is transmitted, by means of a connecting rod splined axially to the rod which is hollow, to an adjusting screw threaded into the outer end of a thermostat extending into the crystal growing oven, the inner end of the screw being operatively connected to electrical contact members of the thermostat, the opening and closing of the contact members controlling a heating means for the oven. Thus, in accordance with the desired temperature program the thermostat is adjusted to cause the oven temperature to drop from 120° F. to 72° F. in fifty-five days.

Other objects and advantages of this invention will more fully appear from the following detailed description, taken in conjunction with the accompanying drawings, in which Fig. 1 is a perspective view, partly broken away, of a temperature control mechanism embodying the features of the invention, the constant speed actuator for the hydraulic pump being shown diagrammatically in the form of a motor driven crank;

Fig. 2 is a longitudinal central section through an adjustable thermostat for controlling the temperature of an oven or other area to be heated in accordance with a definite program;

Fig. 3 is a fragmentary plan section on an enlarged scale, taken on the line 3—3 of Fig. 1, showing the hydraulic pump and valve in one operative position;

Fig. 4 is a vertical section taken on the line 4—4 of Fig. 3;

Figs. 5, 6 and 7 are fragmentary views similar to Fig. 4 showing the hydraulic pump and valve in other operative positions; and Fig. 8 is a plan section taken on the line 8—8 of Fig. 6.

Referring now to the drawings, particularly to Fig. 1, a base block of a temperature control mechanism embodying the features of this invention is indicated at 10, from which extend vertically a hydraulic cylinder 11 and a chamber 12, the latter containing a supply of oil for the cylinder. Intermediate the cylinder 11 and chamber 12 is a hydraulic pump and valve, indicated in general at 13, which, in the operation of the mechanism, intermittently pumps oil supplied from the chamber to the cylinder and below a piston 14 at a very low rate in a manner and for a purpose to be presently described. Attached to the piston 14 is a hollow rod 17, which extends through the upper end of the cylinder. Freely slidable within the hollow of the rod 17 and splined thereto, as indicated at 18, is a rod 19, to the upper enlarged end of which is attached a screw 20, the screw being freely rotatably threaded into a threaded end wall 21 (Fig. 2) of an adjustable thermostat, indicated in general at 24. Secured to the upper end of the rod 17 and outside the cylinder 11 is a bracket arm 25, on the outer end of which is rotatably carried a cam follower or roller 26, which is arranged to ride in a cam slot 27 of the required contour formed in an arcuate shaped plate 28. The cam plate 28 is supported at its lower end, as indicated at 31, to the cylinder 11 and at its upper end from an arm 32 of a bracket 33 clamped to the lower end of a casing 34 of the thermostat 24. From the above description, it will be apparent that as the piston 14 and rod 17 are slowly raised by the oil entered at a very low rate into the cylinder 11 by the pump 13, they will also be slowly rotated as the cam roller 26 follows the cam slot 27. At the same time, due to the splined connection 18 between the hollow rod 17 and rod 19, the latter will likewise be rotated and in a manner to be presently described will also be elevated at a slower rate than the rod 17. As indicated by the arrow surrounding the rod 19 in Figs. 1 and 2, the rotatable parts including the screw 29 are rotated in a counterclockwise direction due to the formation of the cam slot 27.

The hydraulic pump and valve 13, referring particularly to Figs. 3 to 8, inclusive, comprises a rotary valve member 37 journalled in an aperture 38 formed in the base block 10. Rotatably free upon the valve member 37 is a lever 39, to the outer end of which is pivotally connected an actuating rod 40, which, in the operation of the mechanism, is constantly being reciprocated. To the valve member 37 is attached a lever 41, which is yieldably connected to the lever 39 by a coiled tension spring 44 so that upon a counterclockwise movement of the lever 39 from its normal position shown in Fig. 4 to that shown in Figs. 5 and 6, the lever 41 will move in a similar direction and with it the valve member 37. Within a right hand spirally screw threaded bore 45 of the valve member 37 is a similarly threaded member 46, to the outer end of which is attached a lever 47. One arm of the lever 47 carries an adjustable screw 48 and an opposite arm is arranged to abut an adjustable stop screw 49, when the lever is in its normal position, as shown in Fig. 4. Extending laterally from opposite side faces of an arm of the lever 39 are lugs 51 and 52, so arranged that one face of the lug 51 engages an arm of the lever 41 in the normal position thereof (Fig. 4) and, during its operating movement counterclockwise, one face of the lug 52 engages the screw 48 on the lever 47. Also, in the normal position of the lever 39, a laterally extending pin 53 on an arm of the lever engages an arm on the lever 47. Another arm of the lever 41 is arranged to engage, at the end of its counterclockwise movement (Figs. 5 and 6), a stop pin 54.

At its inner end the member 46 is reduced, as indicated at 55, to provide a very small piston or plunger of circular cross-section, which operates in a correspondingly small cylinder 58. Communicating with and extending laterally from the cylinder 58 are passages 59 and 60, which communicate with passages 61 and 62, offset horizontally, as viewed in Figs. 3 and 8, formed in the base block 10, the latter passages communicating with the cylinder 11 and chamber 12, respectively. A by-pass conduit 64, which includes a valve 65, interconnects the cylinder 11 and chamber 12 so that the piston 14 and parts connected thereto may be quickly returned after an operation to their normal position (Fig. 1), wherein the piston is at the lower end of the cylinder and the cam roller 26 is at the lower end of the cam slot 27. By merely opening the valve 65, which is closed while the piston 14 is being elevated, the piston and connected parts are free to return to their normal positions, the oil below the piston quickly passing from the cylinder 11 to the chamber 12, due to the weight of the returning parts.

In certain manufacturing processes involving the application of heat, it is necessary that the heat be maintained over a period in accordance with a definite program. For instance, in the growing of ammonium dihydrogen phosphate crystals in an oven, this period takes fifty-five days. From an initial oven temperature of 120° F., the temperature is lowered to approximately 72° F. at the end of the crystal growing period and the temperature changes are not uniform throughout the period, but are accelerated toward the end of the period. The shape of the cam slot 27 (Fig. 1) illustrates the temperature program as used in the growing of the aforementioned crystals. For different temperature controls or when the control mechanism is used for other purposes, the cam plate 28 may be replaced by another cam plate suitable for the particular use to which the mechanism is to be applied.

The pump and valve actuating rod 40, as shown diagrammatically in Fig. 1, may be operatively connected to a crank 66 operating at a suitable speed from a constant speed motor 67. During each forward and return reciprocation of the rod 40, an operating cycle of the pump and the valve 13 is as follows: With the pump and valve 13 in their normal positions (Figs. 3 and 4) and upon the rod 40 being moved in the direction of the arrow, the lever 39 will be rocked in a counterclockwise direction (Fig. 4) and, through its yieldable connection, provided by the spring 44, to the lever 41 and the attached valve member 37, the latter also being rocked in a similar direction, the lever 47 remaining in position against stop screw 49 and the movement of the lever 41 being stopped by the stop pin 54. This position of the parts is shown in Fig. 5 and it will be noted that the oil passage 60 of the valve member 37 has been cut off from the passage 62 to the oil supply chamber 12 and the oil passage 59 of the valve member 37 has been opened to the passage 61 to the cylinder 11. The arrangement of the oil passages is such that the passage 60 is completely cut off from the passage 62 before the passage 59 is opened to the passage 61 so that at no time is there communication between the oil supply chamber 12 and the cylinder 11. It will also be noted in this position of the parts (Fig. 5) that the lug 52 of the lever 39 has engaged the adjustable stop screw 48 on the lever 47. As the rod 40 continues its forward stroke and the lever 39, as a consequence, its counterclockwise rotation (Fig. 5), the lug 52 on the lever 39 abutting the screw 48 on the lever 47 rotates the latter lever 47 in a similar direction to the position shown in Fig. 6, wherein the rod has completed its forward stroke. This rotation of the lever 47 serves to rotate the spirally threaded member 46 to move the plunger 55 thereon inwardly along the cylinder 58 from its position shown in Fig. 3 to that shown in Fig. 8 and pumping a portion of the oil trapped in the cylinder 58 and the passages 59 and 61 into the cylinder 11 and below the piston 14. It will be apparent that by varying the position of the screw 48 on the lever 47, the stroke of the plunger 55 may be microscopically determined and thus the volume of oil pumped during each reciprocation of the lever 39 and consequently the total volume over a given period of time and thereby the time it will take for the cam roller 26 to traverse the cam slot 27 will be determined.

In the reverse movement of the lever 39, indicated by the arrows in Figs. 6 and 7, the lug 51 on the lever engages the lever 41 (Fig. 7), leaving the lever 47 still in its last operated position, and rotates the lever 41 and the attached valve member 37 clockwise from the position indicated in Figs. 6 and 7 to that shown in Fig. 4, thus cutting off the oil passage 59 from the oil passage 61 to the cylinder 11 and opening the oil passage 60 to the oil passage 62 to the supply chamber 12 in such a manner that the passage 59 is completely cut off before the passage 60 is opened, thus maintaining the pressure of the pumped oil against the piston 14. At the point where the passage 60 is opened, the lever 47 is rocked clockwise (Figs. 6 and 7) by the engagement of the advancing pin 53 on the lever 39 with the arm of the lever 47 to its normal position (Figs. 3 and 4). This movement of the lever 47 rotating the spirally threaded member 46, withdraws the plunger 55 from its inner position (Fig. 8) to its outer normal position (Fig. 3). This completes one cycle of operation of the pump and valve 13 during a forward and reverse reciprocatory movement of the actuating rod 40.

Fig. 2 illustrates one type of an adjustable thermostat 24 adapted to be used in controlling the temperature in an oven, or other space, in accordance with a predetermined program. A pair of bowed contact springs 68 are connected at their upper ends to a member 69 carried from an upper end wall 70 of the thermostat with their lower ends connected to a member 71 in turn connected to a screw threaded rod 72, which is freely threaded into a threaded aperture in the rotatable screw 20. A pair of spaced guide lugs 73 are fixed at diametrical points to the inner face of the thermostat casing 24, whereby rotation of the member 71 and thereby the rod 72 and the springs 68 is prevented. Intermediate their ends, the springs 68, upon their inner faces, carry contacts 74, to which are attached conductors 75, which are included in an electrical circuit which may be connected to suitable means (not shown) for causing the oven to be heated in accordance with a predetermined program. The screw threads upon the outer faces of the screw 20 and rod 72 in the particular embodiment shown are right-hand and the thread on the rod may have one thread less per inch than the thread on the screw 20. Thus, in the operation of the mechanism and assuming that initial adjustments have been made for the desired temperature program, as the screw 20 is rotated through an angle of 30° in a counter-clockwise direction, as indicated by the arrows in Figs. 1 and 2, in the manner previously described and during a period of fifty-five days, the non-rotatable rod 72 will be drawn very slowly downwardly and thereby cause the point at which the contacts open and close to change in accordance with the desired program during the fifty-five day period.

What is claimed is:

1. A mechanism for controlling a cycle of an apparatus comprising a constant speed source of power, means operable therefrom through a fixed stroke at fixed intervals, a fluid delivery device actuated by said means on each stroke of said means in one direction for delivering a measured amount of fluid, a variable control device to control the cycle of the apparatus, and means actuated by the delivered fluid for causing said control device to be varied in accordance with the desired cycle of the apparatus.

2. A mechanism for controlling a cycle of an apparatus comprising a constant speed source of power, means operable therefrom through a fixed stroke at fixed intervals, a fluid delivery device actuated by said means on each stroke of said means in one direction for delivering a measured amount of fluid, a variable control device having a rotatable actuator variable over a predetermined range to control the cycle of the apparatus, reciprocatory means actuated by the delivered fluid, and means operatively connecting said reciprocatory means to said rotatable actuator for rotating the latter to cause said control device to be varied in accordance with the desired cycle of the apparatus.

3. A mechanism for controlling a cycle of an apparatus comprising a constant speed source of power, means operable therefrom through a fixed stroke at fixed intervals, a fluid delivery device actuated by said means on each stroke of said means in one direction for delivering a measured amount of fluid, a variable control device having a rotatable actuator variable over a predetermined range to control the cycle of the apparatus, a hollow rod actuated by the delivered fluid, a rod splined to said hollow rod and operatively connected to said rotatable actuator, a member having a cam track, and a cam roller carried by said hollow rod engaging said track for rotating said hollow rod and actuator to cause said control device to be varied in accordance with the desired cycle of the apparatus.

4. A mechanism for controlling a cycle of an apparatus comprising a constant speed source of power, means operable therefrom through a fixed stroke at fixed intervals, a fluid pump having a plunger movable by said means on each stroke of said means in one direction for delivering a measured amount of fluid, means for varying the movement of said plunger and thereby the amount of fluid delivered, a variable control device to control the cycle of the apparatus, and means actuated by the delivered fluid for causing said control device to be varied in accordance with the desired cycle of the apparatus.

5. A mechanism for controlling a cycle of an apparatus comprising a constant speed source of power, means operable therefrom through a fixed stroke at fixed intervals, a fluid pump having a plunger movable by said means on each stroke of said means in one direction for delivering a measured amount of fluid for each stroke in said one direction, a lever connected to said means, a second lever operatively connected to said plunger for actuation by said first-mentioned lever to actuate said plunger on each stroke of said means, means interconnecting said second lever to said plunger for varying the movement imparted thereto by said first lever and thereby the amount of fluid delivered, a control device, and means actuated by the delivered fluid for causing said control device to be varied in accordance with the desired cycle of the apparatus.

6. A mechanism for controlling a cycle of an apparatus comprising a constant speed source of power, means operable therefrom through a fixed stroke at fixed intervals, a variable control device variable over a predetermined range to control the cycle of the apparatus, hydraulic actuating means for said control device, a pump actuated by said first-mentioned means on each stroke of said means in one direction for delivering a measured amount of fluid to said hydraulic actuating means including a cylinder having fluid inlet and outlet apertures, a reciprocatory and oscillatory piston in said cylinder, means effective for reciprocating said piston in response to oscillatory movements thereof, and means including said first-mentioned means for imparting oscillatory movements to said piston at a predetermined rate.

7. A mechanism for controlling a cycle of an apparatus comprising a constant speed source of power, means operable therefrom through a fixed stroke at fixed intervals, a variable control device variable over a predetermined range to control the cycle of the apparatus, hydraulic actuating means for said control device, means for delivering fluid to said actuating means, including an oscillatory valve, a cylinder having fluid inlet and outlet apertures in said valve, a reciprocatory and oscillatory piston in said cylinder, means effective for reciprocating said piston in response to oscillatory movements thereof, and means including said first mentioned means for imparting oscillatory movements to said valve and piston in timed relation and at a predetermined rate.

8. A mechanism for controlling a cycle of an apparatus comprising a constant speed source of power, means operable therefrom through a fixed stroke at fixed intervals, a variable control device variable over a predetermined range to control the cycle of the apparatus, hydraulic actuating means for said control device, means for delivering fluid to said actuating means, including an oscillatory valve, a cylinder having fluid inlet and outlet apertures in said valve, a member spirally threaded into a bore of said valve, a piston on said member extending into said cylinder and reciprocable therein in response to oscillatory movements of said threaded member, and means including said first-mentioned means for imparting oscillatory movements to said valve and piston in timed relation and at a predetermined rate.

9. A mechanism for controlling a cycle of an apparatus comprising a variable control device whose effect may be varied over a predetermined range to control the cycle of the apparatus, a fluid supply source, hydraulic actuating means for said control device, means for delivering fluid from said supply source to said actuating means, including an oscillatory valve, a cylinder having inlet and outlet apertures in said valve communicating with said supply source and said actuating means, means for oscillating said valve to control the inlet and outlet apertures to cut off a quantity of static fluid from the supply source and entrap it in and between the cylinder and said actuating means, a piston in said cylinder, means for reciprocating said piston in response to oscillatory movements of said valve, a constant speed source of power, and means operable therefrom through a fixed stroke at fixed intervals for actuating said valve oscillating means to impart oscillatory movements to said valve and piston in timed relation and at a predetermined rate.

CECIL C. McCAIN.

REFERENCES CITED

The following references are of record in the file of this patent:

UNITED STATES PATENTS

| Number | Name | Date |
|---|---|---|
| 1,135,617 | Reno et al. | Apr. 13, 1915 |
| 2,101,226 | Sonntag | Dec. 7, 1937 |
| 2,192,778 | Stacy | Mar. 5, 1940 |